United States Patent
Brooks et al.

(10) Patent No.: US 11,507,177 B2
(45) Date of Patent: Nov. 22, 2022

(54) POWER MANAGEMENT SYSTEMS (71) Applicant: Hewlett-Packard Development Company, L.P., Spring, TX (US)

(72) Inventors: Robert C. Brooks, Spring, TX (US); Michael R. Durham, Spring, TX (US); Mark A. Piwonka, Spring, TX (US); Jeffrey C. Stevens, Spring, TX (US); Nam H. Nguyen, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,043

(22) PCT Filed: May 17, 2019

(86) PCT No.: PCT/US2019/032979
§ 371 (c)(1),
(2) Date: Jun. 28, 2021

(87) PCT Pub. No.: WO2020/236143
PCT Pub. Date: Nov. 26, 2020

(65) Prior Publication Data
US 2022/0075441 A1    Mar. 10, 2022

(51) Int. Cl.
*G06F 1/32* (2019.01)
*G06F 1/3287* (2019.01)

(52) U.S. Cl.
CPC .................... *G06F 1/3287* (2013.01)

(58) Field of Classification Search
CPC ................ G06F 1/3287; G06F 1/266
See application file for complete search history.

(56) References Cited

U.S. PATENT DOCUMENTS

| | | | |
|---|---|---|---|
| 7,474,276 B2 | 1/2009 | Endo et al. | |
| 7,541,776 B2 | 6/2009 | Tupman et al. | |
| 9,104,396 B2 | 8/2015 | Taki | |
| 9,477,288 B2 | 10/2016 | Yang | |
| 2003/0107566 A1 | 6/2003 | Shin et al. | |
| 2009/0100275 A1 | 4/2009 | Chang et al. | |

(Continued)

FOREIGN PATENT DOCUMENTS

TW    201802699 A    1/2018

OTHER PUBLICATIONS

USB-C Definition, retrieved from the internet at <https://techterms.com/definition/usb-c> (Year: 2015).*

*Primary Examiner* — Stefan Stoynov
(74) *Attorney, Agent, or Firm* — Perry + Currier Inc (57) ABSTRACT

An example of an apparatus is provided. The apparatus includes a power supply to connect to a power source. The power supply is to receive and to distribute a total power from the power source. The apparatus further includes a first device to receive a first portion of the total power from the power supply. The apparatus further includes a second device to receive a second portion of the total power from the power supply. A sum of the first portion and the second portion is the total power. In addition, the apparatus includes a controller to control the second device, wherein the controller is to determine the total power demanded by the first device and the second device. The controller is to reduce the second portion of the total power and to restore the second portion of the total power.

15 Claims, 4 Drawing Sheets

(56) References Cited

U.S. PATENT DOCUMENTS

| | | |
|---|---|---|
| 2009/0160404 A1 | 6/2009 | Iwai |
| 2009/0267927 A1 | 10/2009 | Yun |
| 2010/0023786 A1 | 1/2010 | Lieberman |
| 2010/0156178 A1 | 6/2010 | Holmberg |
| 2012/0144215 A1* | 6/2012 | Naffziger .................. G06F 1/26 |
| | | 713/340 |
| 2013/0289773 A1 | 10/2013 | Waki |
| 2015/0046726 A1 | 2/2015 | Yokoyama et al. |
| 2018/0239718 A1 | 8/2018 | Jabori et al. |
| 2018/0314309 A1* | 11/2018 | Lyu ......................... G06F 1/266 |

* cited by examiner

POWER MANAGEMENT SYSTEMS

BACKGROUND

Power supplies are used to provide power, such as electric power, to components of a system, such as a computer system. In particular, a power supply may be used to convert power from a power source, such as an electrical outlet, to power for components, such as in the form of a direct current. Accordingly, power supplies may be used for various computer systems since computer systems include several different components.

Components that are supplied power from a power supply may vary during normal operations. For example, an internal hard disk may not draw much power when at rest, but when data is requested, additional power may be used to power a motor to spin the disk. Therefore, power supplies may also be rated for a maximum power. If the components demand power above the maximum power rating, damage to the power supply from overheating may occur.

BRIEF DESCRIPTION OF THE DRAWINGS

Reference will now be made, by way of example only, to the accompanying drawings in which.

DETAILED DESCRIPTION

Power supplies are generally used to supply power to computer systems as well as peripheral devices of a computer system. For example, each device of a general computer system may have a separate power supply plugged into a standard wall power outlet. In particular, a computer processing unit may be plugged into a wall outlet. A monitor may also be plugged into a wall outlet. Oher peripherals which may have their own power supply may include an additional monitor, a printer, a scanner, a docking station, and/or an external memory storage unit.

In this example, each of the devices may include a separate power supply with a rating appropriate for the device. For example, a computer processing unit may have a power rating of about 100 W to support the components if they were each to draw a high amount of power. Some printers may have a power rating of about 50 W to support the components due to the additional mechanical parts of the printer used to move paper and/or a printer head. A display unit may have a power rating of about 70 W to support the components. Since each device may not be running at peak power consumption for a majority of the time, the actual power demanded is generally lower than the sum of the power ratings for each device of the computer system. Accordingly, to use a separate power supply for each device will generally result in a waste of power capacity since each device rarely runs at full capacity. Furthermore, separate power supplies generally use separate cables which may lead to clutter around the computer system.

There is provided an apparatus to manage power between a plurality of devices using a single power supply. In particular, the power supply rating of the power supply in the apparatus is to be lower than the sum of the peak power demand for all the devices to which the power supply is to supply power. The apparatus further includes a controller that may be used to communicate control signals or messages to one of the devices to which the apparatus supplies power. Therefore, the controller may direct the device to self-limit power demand when the total power demanded from the power supply approaches an upper threshold. When the total power demanded from the power supply decreases, the controller may send a further control signal to the device to remove any power limitations. Therefore, by using a single power supply, the average excess capacity may be designed to be less than if separate power supplies are used for each device. In particular, averaging the power usage between the devices provides for more efficient use of power capacity of the single power supply. Furthermore, by using the single power supply the number of cables supplying power to the computer system may be reduced.

Figure 1:
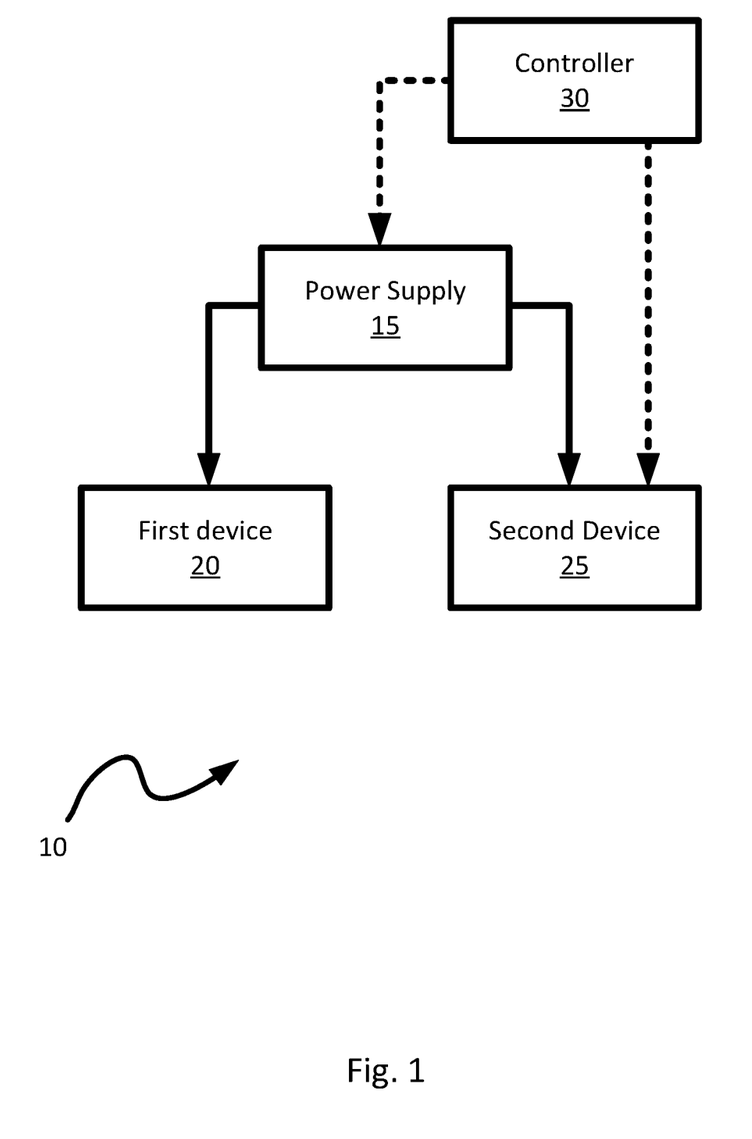
FIG. 1 is a block diagram of an example apparatus to manage power between a plurality of devices.

Referring to FIG. 1, an apparatus to manage power between a plurality of devices is generally shown at 10. The apparatus 10 may include additional components, such as various additional interfaces, indicators and/or displays to interact with a user or operator of the apparatus. For example, such additional interfaces may provide information regarding the amount of power supplied to each device or actions taken by the controller to manage the power as discussed in greater detail below. In addition, the apparatus 10 may include a user input device, such as a touchscreen or a plurality of buttons to allow for the user to provide input to the controller or to override the controller. In the present example, the apparatus 10 includes a power supply 15, a first device 20, a second device 25, and a controller 30.

In the present example, the power supply 15 is to connect to a power source, such as an external wall outlet. Accordingly, the power supply 15 is to receive an amount of power from the power source and then subsequently distribute the power to the first device 20 and the second device 25.

In the present example, the manner by which the power supply 15 distributes the power received from the power source is not particularly limited. For example, the power supply 15 may provide the power used by the electrical load depending on the operational state of each of the components forming the electrical load. In such an example, the power supply 15 may be susceptible to damage if the electrical load requests an amount of power above what the power supply 15 may be able to physically supply. By providing power above an intended limit, the power supply 15 may overheat and to cause damage to itself as well as nearby components. For the purposes of discussion, it may be assumed that in the present example, the power supply 15 has an upper operating limit of providing 120 W.

In other examples, the power supply 15 may provide power solely to a threshold amount. In such an example, the power supply 15 may be protected by a fuse or circuit breaker. Accordingly, if the electrical load requests power above the threshold amount, the power supply 15 may be disabled by tripping the fuse or circuit breaker to protect itself as well as components near the power supply 15 from damage. In such an example, the power supply 15 may be reset by a user such as by replacing the fuse or resetting the circuit breaker manually. In further examples, the power supply 15 may include a system capable of reducing or stopping the power output from the power supply without disabling the power supply 15. In this example, the power supply 15 may be restarted after a fixed period of time or if the electrical load decreases.

The first device 20 is to receive a portion of the power distributed by the power supply 15. The exact amount of power received by the first device 20 is not particularly limited and is dependent upon the operational state of the first device 20. In the present example, the first device 20 may be a display system. Accordingly, the first device 20 may include a processor to render an image, a memory storage unit to store the image files and the rendered image, a light source, and a modulator for the light source to generate an image on the screen. It is to be appreciated that each of these components use electric power from the power supply 15 to operate. In addition, the amount of power drawn by each of these components will vary dependent on the state of the display system as a whole. For example, if a source file is received at the first device 20 is complicated and a significant amount of processing is used to generate a rendered image, the processor may draw a relatively large amount of power. Similarly, if the image is rapidly changing, the modulator may use a relatively large amount power. In contrast, if the first device 20 is not receiving data, the first device 20 may be in a sleep mode or screen saver mode in the present example and draw a very small amount of power. It is to be assumed for the purposes of discussion that the first device 20 in this example may draw up to about 70 W of power if all components are to operate at full capacity. However, the first device 20 rarely operates in this state and may instead operate by drawing a combined power of about 40 W during normal use, and about 10 W when idle.

The second device 25 is to receive another portion of the power distributed by the power supply 15. The exact amount of power received by the second device 25 is not particularly limited and is dependent upon the operational state of the second device 25. In the present example, the second device 25 may be a computer module or desktop unit. Accordingly, the second device 25 may include a central processor unit, various communication interfaces such as a graphics interface, and/or network interface, a memory storage unit such as a hard drive, a fan unit to cool various components within the computer module, and other components that may be used during the operation of the computer module. It is to be appreciated that each of these components use power ultimately from the power supply 15 to operate. In addition, the amount of power drawn by each of the components will vary dependent on the state of the computer module as a whole. For example, if the second device 25 is charging a battery, the charging capability may be suspended or reduced. Furthermore, it the second device 25 is performing complicated calculations, the central processing unit will draw a significant amount power to carry out the calculations. Similarly, if the second device 25 is receiving data from a network via a network interface card, the network interface card may draw a relatively large amount of power receiving data packets from the network. In addition, if the memory storage unit may draw a relatively large amount of data as it writes the data packets received to memory. In contrast, if the second device 25 is not being used, the second device 25 may enter into a sleep mode in the present example and draw a very small amount of power. It is to be assumed for the purposes of discussion that the second device 25 in this example may draw up to about 90 W of power if all components are to operate at full capacity. However, the second device 25 rarely operates in this state and may instead operate by drawing a combined power of about 60 W during normal use, and about 10 W to 20 W when idle.

Continuing with the present example, the apparatus 10 includes the first device 20 and the second device 25. In this particular example, there are no additional devices. Accordingly, it may be assumed that the total power distributed by the power supply 15 is the sum of the power provided to the first device 20 and the second device 25. Therefore, if both of the first device 20 and the second device 25 operate at full capacity, the total draw of electrical power from the power supply 15 will be 160 W, which is above the upper operational limit of the power supply 15. However, if both the first device 20 and the second device 25 operated in an average state, the total draw of electrical power from the power supply 15 will be about 100 W which is within the upper operational limit of the power supply 15.

Furthermore, in the present example, the second device 25 may be a smart device capable of regulating its own power demands. For example, the second device 25 may be capable of lowering the power consumption of the central processing unit at the cost of slowing down the processing capability. Similarly, the second device 25 may be capable of slowing the reading and writing speed of the memory storage unit or the communication interfaces. In addition, the second device 25 may temporarily shut down non-essential components temporarily, such as a fan unit or a processor that is not used.

The controller 30 is to control the amount of power drawn by the second device 25. In the present example, the controller 30 determines the power drawn by the first device 20 and the second device 25. The manner by which the controller determines the power drawn by the first device 20 and the second device 25 is not particularly limited and may involve measuring the current provided to each of the first device 20 and the second device 25. Accordingly, the controller 30 may respond to instantaneous changes based on a single measurement in some examples.

In other examples, the controller 30 may take multiple measurements before taking any action to limit the power of the second device 25. Since the power drawn by the first device 20 and the second device 25 may fluctuate over time due to changes in the operational state of the first device 20 and the second device 25, the power drawn by both devices may be measured over a period of time. Accordingly, periodic data points may be measured to determine an average power draw by the first device 20 and the second device 25. For example, the average power may be determined over a period of about 60 s using a sampling rate of about 300 ms in some examples. In other examples, the average power drawn by the first device 20 and the second device 25 may be determined over a shorter period, such as about 10 s, or over longer periods of about 5 minutes or 10 minutes to sustain longer or larger power spikes. In other examples, the sampling rate may also be slower or faster. For example, the sampling rate may be about 10 ms or 100 ms in some examples, and in other examples, the sampling rate may be slowed to every 500 ms or 1000 ms.

In the situation where the total power demanded by the first device 20 and the second device 25 is above a threshold value, the controller 30 is to reduce the amount of power drawn by the second device 25. It is to be appreciated that setting the threshold value is not limited. For example, the threshold limit may be close to the operation upper limit of the power supply 15, or it may be lower to provide a buffer. In other examples, the threshold limit may be greater than the operational upper limit of the power supply 15 to allow the apparatus to temporarily run above a recommended operational upper limit. The manner by which the controller 30 reduces the amount of power drawn by the second device 25 is not particularly limited. For example, the controller 30 may transmit a command to the second device 25 via a message to reduce the amount of power drawn by the second device 25. It is to be appreciated in this example that the controller 30 does not limit the amount of power distributed to the second device 25 or cut off the power provided to second device 25. Instead, the controller 30 provides a command to the second device 25 and the second device 25 is to take local action and determine how to meet the limit on power imposed by the controller 30. It is to be appreciated that this allows the second device 25 to examine the processes running within and to determine which components are to have power limited. Accordingly, the second device 25 may determine the most effective way to achieve the power reduction with minimal impact to the processes that may be running instead of reducing power to the second device 25 from the power supply 15.

The messages sent to the second device 25 from the controller 30 may be any type of control signal. For example, the message may be a power data object as defined in a universal serial bus power delivery specification (USB PD spec). In this example, once the second device 25 receives the power data object, a system management interrupt is generated and handled by the BIOS (basic input/output system) of the second device 25 to control the power to be delivered to various components within the second device 25.

The amount by which the controller 30 limits the power of the second device 25 is not fixed. In one example, the controller 30 may send a command to the second device 25 to reduce power demand by a fixed amount. Continuing with the example above of a power supply 15 with an upper operational limit of approximately 120 W, the controller 30 may direct the second device 25 to reduce power by about 10 W. The controller 30 may then reiterate the measurement to determine whether the power demand has been sufficiently reduced to below the predetermined threshold.

In another example, the controller 30 may also measure the power drawn by the first device 20, the second device 25, or both the first device 20 and the second device 25. The manner by which the controller 30 determines the individual power demand of the first device 20 and the second device 25 may be carried out as described above for measuring the total power. For example, the controller 30 may make a determination on a single measurement, or the controller 30 may take multiple measurements over a period of time and use an average power demand for the first device 20 and/or the second device 25.

In the present example, once the power demand of the second device 25 is determined, the controller 30 may determine the amount that the total power drawn by both the first device 20 and the second device 25 exceeds the upper threshold limit for the power supply 15. The controller 30 may then direct the second device 25 to reduce the power drawn by the amount determined to be above the upper threshold limit. In other examples, the controller 30 may also be able to control the first device 20 and divide the power reduction between the first device 20 and the second device 25 via commands to both devices.

In the situation where the total power demanded by the first device 20 and the second device 25 is below another threshold value, the controller 30 is to reduce or remove the limits on the amount of power to be drawn by the second device 25. It is to be appreciated that setting this threshold value is not limited. In particular, this threshold value may be set below the upper threshold value described above. For example, this lower threshold value may be about 10 W less than the upper threshold. In other examples, the lower threshold value may be set closer to the upper threshold value, such as to be approximately 5 W or less below than the upper threshold limit. Further examples may see the lower threshold value set to be about 15 W or more below the upper threshold limit. By setting the lower threshold limit to be less than the upper threshold limit, fluctuations in power consumption by the first device 20 and the second device 25 will not cause the controller 30 to continuously switch between reducing the amount of power drawn by the second device 25 and restoring the amount of power drawn by the second device 25.

The amount by which the controller 30 decreases the limits placed on the second device 25 to restore the second device 25 to draw power freely from the power supply 15 is not fixed. In one example, the controller 30 may send a command, such as a power data object, to the second device 25 to lift all restrictions on the power demand such that the second device 25 may draw power to be used based on the operational state of the second device 25. In another example, the controller 30 may send a command, such as a power data object, to the second device 25 to reduce the limits on power demand by a fixed amount. Assuming the second device 25 is operating under the limit that its power draw is to 60 W and the power drawn by the first device 20 and the second device 25 reaches the combined threshold value of 110 W, the controller may restore the power draw of the second device 25 to 70 W. The controller 30 may then reiterate the measurement to determine whether the power demand is still below the predetermined lower threshold value.

In another example, the controller 30 may also measure the power drawn by the first device 20 and the second device 25. Once the total power demand of the first device 20 and the second device 25 is determined, the controller 30 may determine the amount of power that may be lifted from the reduction limit placed on the first device 20 and/or the second device 25. The controller 30 may then direct the second device 25 to restore the power drawn by the amount determined to be below the lower threshold limit. It is to be appreciated that once the limit to the power drawn by the second device 25 is about zero, all limitations will effectively have been removed and the power draw by the second device 25 is restored back to unlimited. In the event that no limit has been placed on the first device 20 or the second device 25, the total power drawn by both the first device 20 and the second device 25 may continue without limits until the total power exceeds the upper threshold limit for the power supply 15.

In other example, the controller 30 may also be able to limit the power draw of the first device 20. In these examples. the controller may divide the power restoration between the first device 20 and the second device 25 via commands to both devices.

Figure 2:
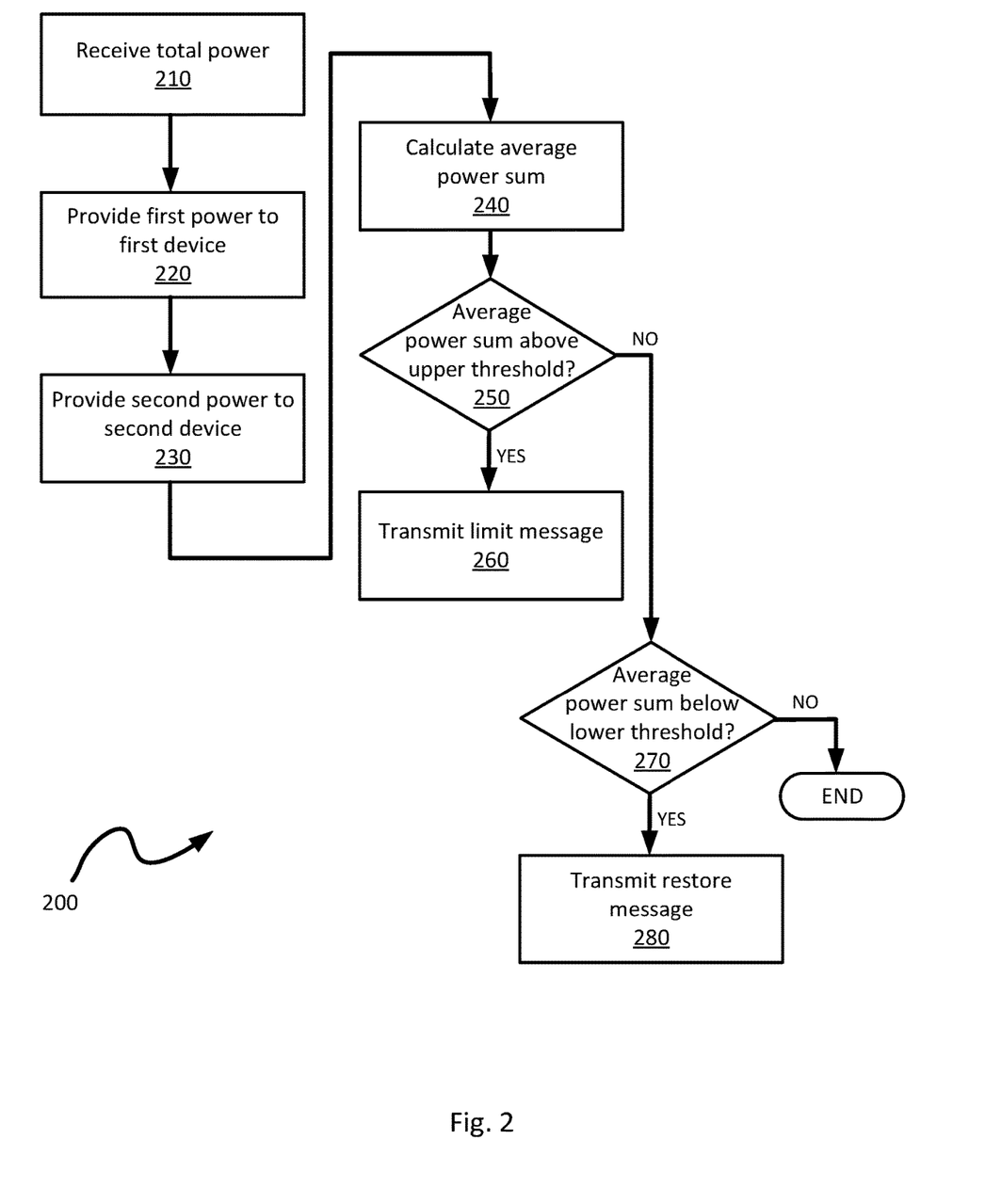
FIG. 2 is a flowchart of an example of a method of managing power between a plurality of devices.

Referring to FIG. 2, a flowchart of a method of operating an apparatus to manage power between a plurality of devices is shown at 200. In order to assist in the explanation of method 200, it will be assumed that method 200 may be performed with the apparatus 10. Indeed, the method 200 may be one way in which apparatus 10 may be operated. Furthermore, the following discussion of method 200 may lead to a further understanding of the apparatus 10 and its various components. It is to be emphasized, that method 200 need not be performed in the exact sequence as shown, and various blocks may be performed in parallel rather than in sequence, or in a different sequence altogether.

Beginning at block 210, the power supply 15 receives electrical power from an external power source. The power received is the total amount of power being supplied to the apparatus 10. It is to be appreciated that the exact amount of power received at the power supply 15 is generally not constant. Instead, the amount of power received at the power supply 15 is dependent on the electrical load of the first device 20, the second device 25, and the controller 30. Accordingly, the sum of the power demands from all the parts of the apparatus 10 determines the total power to be received from the external power source.

In the present example, the power supply 15 may be protected by a fuse or circuit breaker to protect the power supply 15 from drawing too much power from the external power source. Accordingly, if the electrical load requests power above an upper power threshold value, the power supply 15 may be disabled by tripping the fuse or circuit breaker to protect from damage.

In block 220, the power supply 15 provides a portion of the total power to the first device 20. The proportion of the total power forming of this first power is determined by the electrical load or demand of the first device 20 relative to the other devices that are being provided power by the power supply 15. The power drawn by the first device 20 is a portion of the total power drawn by the power supply 15 from the external power source. Since the power supply 15 does not operate above the upper power threshold value due to a safety mechanism in this example, the first device 20 is to draw an amount of power less than the upper power threshold value of the power supply 15.

In the present example, the controller 30 may be used to measure the amount of power drawn by the first device 20. In this example, the controller 30 may take multiple measurements to determine an average power draw of the first device 20 over a period of time. Since the power drawn by the first device 20 may fluctuate over time due to changes in the operational state of the first device 20, the power drawn may be averaged to avoid reduce the effects of temporary spikes or lows in power demand. Accordingly, periodic data points may be measured to determine an average power draw by the first device 20.

In block 230, the power supply 15 provides a portion of the total power to the second device 25. The proportion of the total power forming this second power is determined by the electrical load or demand of the second device 25 relative to the other devices that are being provided power by the power supply 15. The power drawn by the second device 25 is a portion of the total power drawn by the power supply 15 from the external power source. Since the power supply 15 does not operate above the upper power threshold value due to a safety mechanism in this example, the second device 25 is to draw an amount of power less than the upper power threshold value of the power supply 15. However, in some operating conditions, the sum of the power drawn at block 220 and the power drawn at block 230 may exceed the upper power threshold as discuss below.

In the present example, the second device 25 may be used to measure the amount of power drawn by the second device 25. In this example, the controller 30 may take multiple measurements to determine an average power draw of the second device 25 over a period of time. Since the power drawn by the second device 25 may fluctuate over time due to changes in the operational state of the second device 25, the power drawn may be averaged to reduce the effects of temporary spikes or lows in power demand. Accordingly, periodic data points may be measured to determine an average power draw by the second device 25.

Next, block 240 involves calculating the average power sum which is to approximate the total power drawn from the power supply 15. In the present example, the average power sum is obtained by adding the average power drawn by the first device 20 and the second device 25.

Block 250 comprises determining whether the average power sum calculated at block 240 is greater than the upper power threshold value of the power supply 15. In the event that the average power sum is above the upper power threshold value, the method 200 proceeds to block 260. In block 260, the controller 30 is to transmit a limit message to the second device 25. In the present example, the limit message is to direct the second device 25 to place a limit on the power consumption by its components. The manner by which the second device 25 limits its power may involve examining the processes running within and to determine which components are to have power limited. Accordingly, the second device 25 may determine the most effective way to achieve the power reduction with minimal impact to the processes that may be running instead of having power to the second device 25 reduced as a whole from the power supply 15.

In some examples, the controller 30 may further determine the amount that the average power sum is above the upper power threshold value. In such examples, the limit message provided by the controller 30 may also include the amount the average power sum is above the upper power threshold value. The second device 25 may then be instructed to reduce the power consumption by this amount or a slightly larger amount to avoid triggering another limit message due to a minor power fluctuation.

In the event that the average power sum is not above the upper power threshold value, the method 200 proceeds to block 270. Block 270 comprises determining whether the average power sum calculated at block 240 is below the lower power threshold value. In the event that the average power sum is below the lower power threshold value, the method 200 proceeds to block 280. In block 280, the controller 30 is to transmit a restore message to the second device 25. In the present example, the restore message is to direct the second device 25 to remove or reduce a limit on the power consumption by its components. The manner by which the second device 25 removes the limits on its power may completely remove all limits. In another example, the limits on power consumption at the second device 25 may be incrementally relaxed until completely removed. It is to be appreciated that in some iterations of the method 200, the second device 25 may be under no limitations on the amount of power it may consume. Accordingly, if the method reaches block 280, then no action is to be taken by the second device 25 upon receiving the restore message. In the event that the average power sum is not below the lower power threshold value, the method 200 simply ends as no action is taken to manage the power supply 15.

Figure 3:
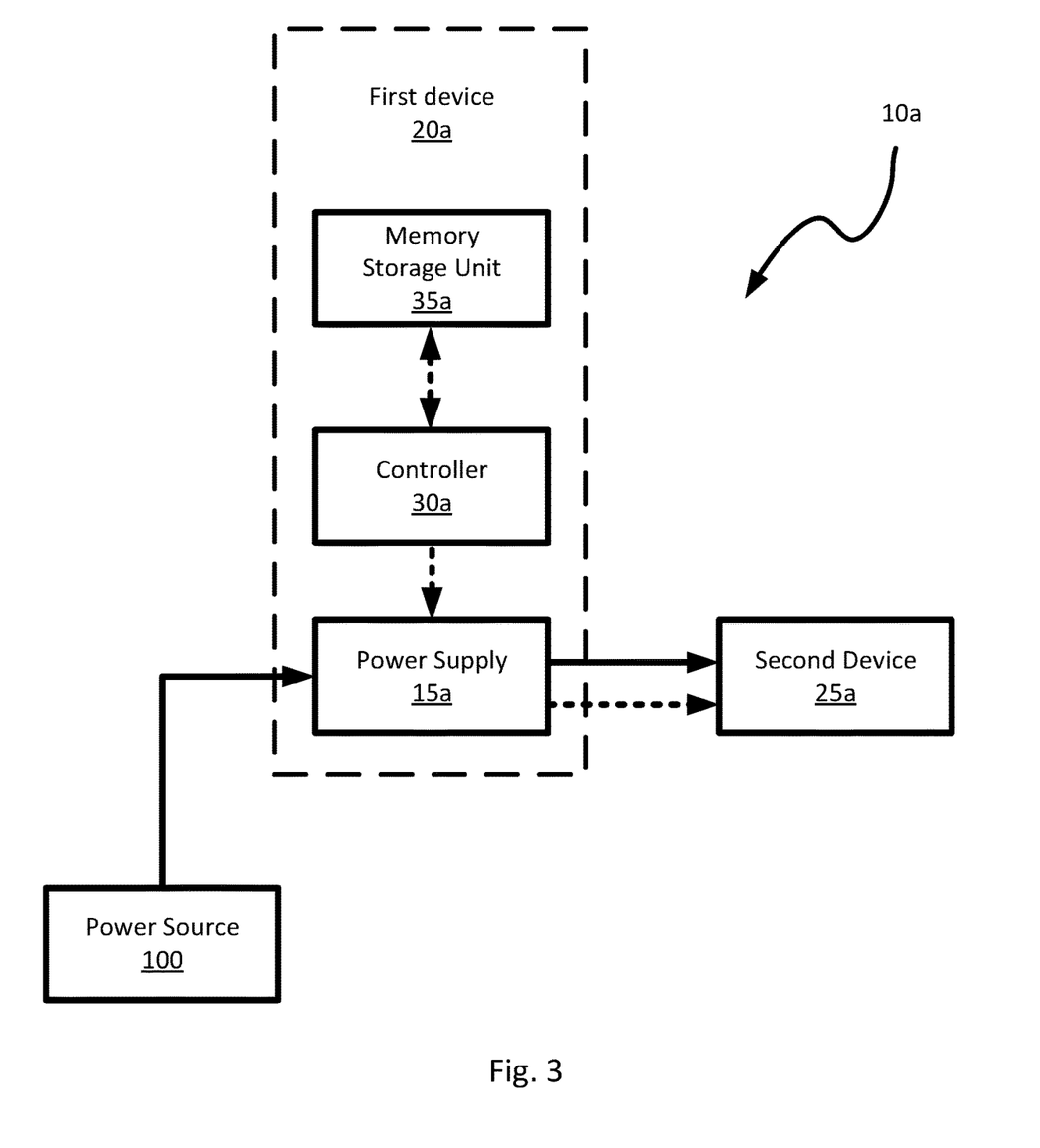
FIG. 3 is a block diagram of another example apparatus to manage power between a plurality of devices.

Referring to FIG. 3, another example of an apparatus to manage power between a plurality of devices is shown at 10a. Like components of the apparatus 10a bear like reference to their counterparts in the apparatus 10, except followed by the suffix "a". The apparatus 10a includes a power supply 15a, a first device 20a, a second device 25a, a controller 30a, and a memory storage unit 35a.

In the present example, the first device 20a includes the power supply 15a, the controller 30a, and the memory storage unit 35a. Accordingly, the first device 20a may be a display system capable of being plugged into a power source such as a wall outlet. The first device 20a may then have additional devices, such as the second device 25a, or other peripheral components connected thereto via a connector. The connector is not particularly limited an may be any connector capable of providing a data connection as well as providing power from the first device 20a to the additional devices, such as the second device 25a, or other peripheral components. In the present example, the connector is a USB-C interface capable of providing power to the second device 25a from the power supply 15a in the first device 20a. In addition, the USB-C interface is also capable of transmitting messages, such as the limit messages and restore messages discussed above, in the form of power data objects, to the second device 25a.

The apparatus 10a further includes a memory storage unit 35a within the first device 20a. The memory storage unit 35a is to store data received, generated, and used by the first device 20a. The manner by which the memory storage unit 35a stores the data is not particularly limited. In the present example, the memory storage unit 35a may include a non-transitory machine-readable storage medium that may be, for example, an electronic, magnetic, optical, or other physical storage device. In addition, the memory storage unit 35a may store an operating system that is executable by the first device 20a to provide general functionality. Continuing with the present example of the first device 20a being a display system, the operating system may provide functionality to various components to render data. Examples of operating systems include Android™, Linux™, Unix™, macOS™, iOS™, and Windows™. The memory storage unit 35a may additionally store instructions to operate a processor (not shown) within the first device 20a to carry out various functions described above as well as the method 200.

Figure 4:
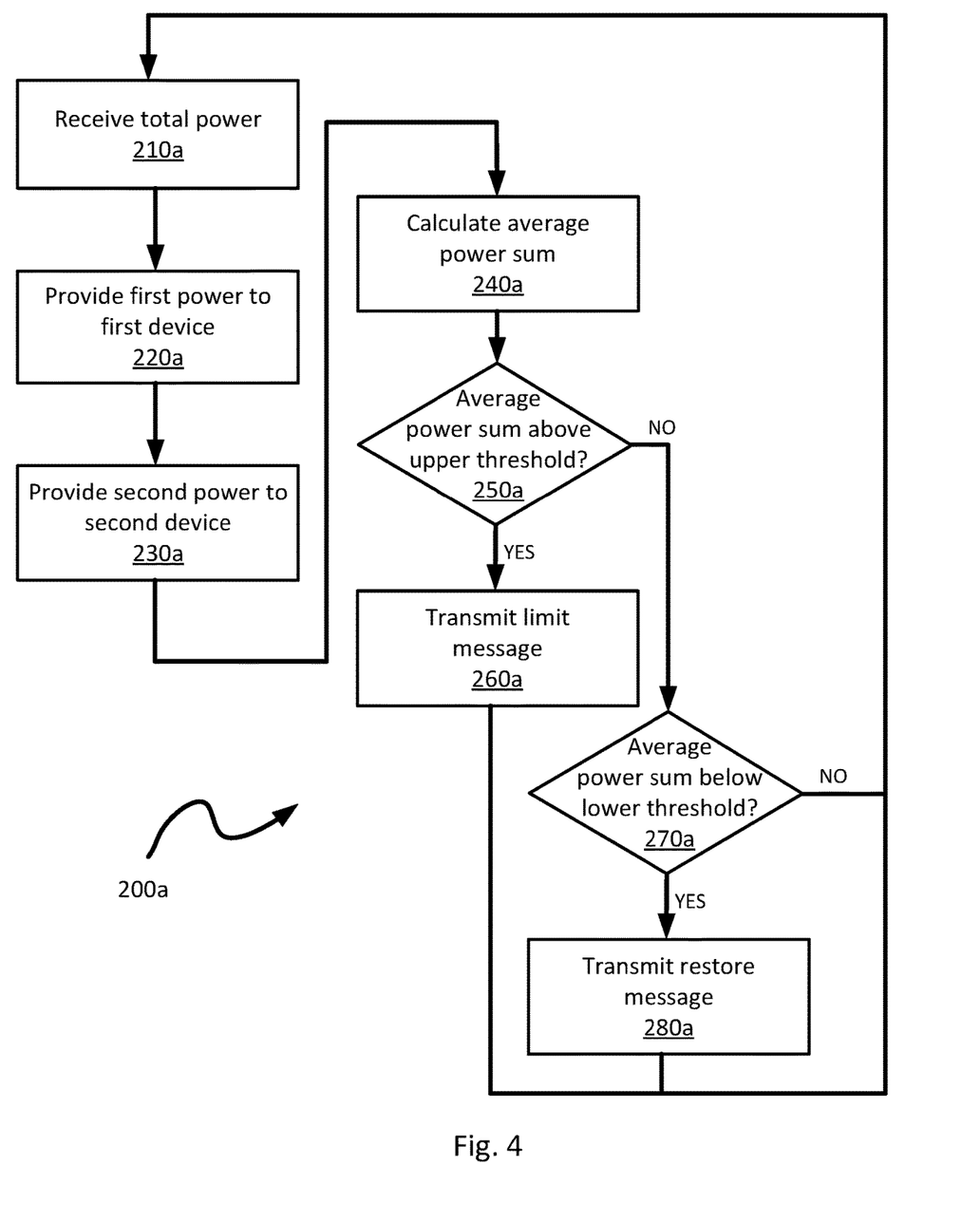
FIG. 4 is a flowchart of another example of a method of managing power between a plurality of devices.

Referring to FIG. 4, a flowchart of another example method of operating an apparatus to manage power between a plurality of devices is generally shown at 200a. Like blocks of the method 200a bear like reference to their counterparts in the method 200, except followed by the suffix "a". In order to assist in the explanation of method 200a, it will be assumed that method 200a may be performed with the apparatus 10a. Indeed, the method 200a may be another way in which apparatus 10a may be configured. Furthermore, the following discussion of method 200a may lead to a further understanding of the apparatus 10a and the various ways in which it may be configured. It is to be appreciated the method 200a may also be applied to the apparatus 10.

Beginning at block 210a, the power supply 15a receives electrical power from an external power source. In the present example, the power supply 15 has an upper operating limit and is protected by a fuse or circuit breaker to avoid having the power supply 15a drawing too much power from the external power source.

In block 220a, the power supply 15a provides a first portion of the total power to the first device 20a. In this example, the first portion of the total power is to be distributed directly to the components of the first device 20a by the power supply 15a. Similarly, in block 230a, the power supply 15a provides a second portion of the total power to the second device 25a. Since the second device 25a is separate from the first device 20a, the power is transmitted to the second device 25a via a connector, such as a USB-C interface.

In the present example, the controller 30a is to measure the amount of power drawn by the first device 20a and the second device 25a. In this example, the controller 30a may take multiple measurements to determine an average power draw of the first device 20a and the second device 25a over a period of time.

Next, block 240a involves calculating the average power sum which involves adding the power measured during the execution of blocks 220a and 230a.

Block 250a comprises determining whether the average power sum calculated at block 240a is greater than an upper power threshold value of the power supply 15a. The upper power threshold may be set relative to the upper operating limit, such as 10 W below the operating limit. In the event that the average power sum is above the upper power threshold value, the method 200a proceeds to block 260a to transmit a limit message to the second device 25a. In the present example, the limit message is a command to direct the second device 25a to limit the power demand by its components.

In the event that the average power sum is not above the upper power threshold value, the method 200a proceeds to block 270a. Block 270a comprises determining whether the average power sum calculated at block 240a is below than the lower power threshold value. In the event that the average power sum is below the lower power threshold value, the method 200a proceeds to block 280a. In block 280a, the controller 30a is to transmit a restore message to the second device 25a. In the present example, the restore message is a command to direct the second device 25a to reduce the limit on the power demand by its components, if a limit is present.

In the event that the average power sum is not below the lower power threshold value, the method 200a loops back to block 210a. It is to be appreciated that the method 200a is an iterative loop that continues to repeat. In some examples, a delay may be added so that the loop to be carried out less frequently to reduce demand on the resources of the controller 30a.

It should be recognized that features and aspects of the various examples provided above may be combined into further examples that also fall within the scope of the present disclosure.

What is claimed is:

1. An apparatus comprising:
a power supply to connect to a power source, the power supply to receive and to distribute a total power from the power source;
a first device to receive a first portion of the total power from the power supply;
a second device to receive a second portion of the total power from the power supply, wherein a sum of the first portion and the second portion is the total power; and
a controller to control the second device, wherein the controller is to determine the total power demanded by the first device and the second device, the controller to reduce the second portion of the total power if the total power is above an upper threshold value, and the controller to restore the second portion of the total power if the total power is below a lower threshold value,
wherein the lower threshold value is lower than he upper threshold value, and the controller restores the second portion of the total power, if the total power is below the lower threshold value, only after the second portion of the total power is reduced.

2. The apparatus of claim 1, wherein the controller is to determine the total power via a measurement of the total power over a period of time.

3. The apparatus of claim 2, wherein the controller is to determine the second portion of the total power over the period of time.

4. The apparatus of claim 3, wherein the controller determines an amount the total power exceeds the upper threshold value.

5. The apparatus of claim 4, wherein the controller is to reduce the second portion by the amount.

6. The apparatus of claim 5, wherein the power supply and the controller are disposed within the first device.

7. The apparatus of claim 6, wherein the second device is to connect to the first device via a USB-C interface, wherein messages from the controller and the second portion of the total power is to be transmitted via the USB-C interface.

8. A method comprising:
   receiving a total power at a power supply to connect to an external power source, wherein the power supply has an upper power threshold;
   providing a first power to a first device, wherein a first average of the first power over a time period is less than the upper power threshold;
   providing a second power to a second device, wherein a second average of the second power over the time period is less than the upper power threshold;
   calculating an average power sum of the first average and the second average;
   transmitting a limit message to the second device if the average power sum is above the upper power threshold, the limit message to place a limit on a power consumption from the second device; and
   after the limit message is transmitted, transmitting a restore message to the second device if the average power sum is below a lower power threshold, the restore message to remove the limit on power consumption at the second device, the lower power threshold lower than the upper power threshold,
   wherein the removal of the power limit on power consumption at the second device is done only after the second average of the second power is reduced.

9. The method of claim 8, further comprising determining an amount the average power sum exceeds the upper power threshold.

10. The method of claim 9, wherein the limit message is to instruct the second device to reduce the power consumption by the amount.

11. The method of claim 10, wherein transmitting the limit message sends the limit message via a USB-C interface.

12. The method of claim 11, wherein providing the second power to the second device is to be carried out via the USB-C interface.

13. A non-transitory machine-readable storage medium encoded with instructions executable by a processor, the non-transitory machine-readable storage medium comprising:
   instructions to receive a total power at a power supply with an upper power threshold;
   instructions to calculate a first average of a first portion of the total power and a second average of a second portion of the total power over a time period;
   instructions to calculate an average power sum of the first average and the second average;
   instructions to transmit a limit message to a second device if the average power sum is above the upper power threshold, wherein the limit message is a first command to limit a power demand at the second device; and
   instructions to, after the limit message is transmitted, transmit a restore message to the second device if the average power sum is below a lower power threshold, wherein the restore message is a second command to reduce the limit on power demand at the second device, the lower power threshold lower than the upper power threshold,
   wherein the removal of reduction the limit on power demand at the second device is done only after the second average of the second portion of the total power is reduced.

14. The non-transitory machine-readable storage medium of claim 13, further comprising instructions to determine an amount the average power sum exceeds the upper power threshold.

15. The non-transitory machine-readable storage medium of claim 14, wherein the limit message is to instruct the second device to reduce the power demand by the amount.

* * * * *